United States Patent

Yoneda et al.

[11] Patent Number: 5,562,526
[45] Date of Patent: Oct. 8, 1996

[54] METHOD AND APPARATUS FOR GRINDING A WORKPIECE

[75] Inventors: Takao Yoneda; Takayuki Hotta, both of Nagoya, Japan

[73] Assignee: Toyoda Koki Kabushiki Kaisha, Kariya, Japan

[21] Appl. No.: 219,273

[22] Filed: Mar. 29, 1994

[30] Foreign Application Priority Data

Mar. 29, 1993 [JP] Japan .................................. 5-070356
Mar. 29, 1993 [JP] Japan .................................. 5-070360

[51] Int. Cl.⁶ ...................................................... B24B 49/00
[52] U.S. Cl. .................................. 451/9; 451/10; 451/11; 451/242
[58] Field of Search ................................ 451/8, 9, 10, 11, 451/242, 246

[56] References Cited

U.S. PATENT DOCUMENTS

| | | | |
|---|---|---|---|
| 3,967,414 | 7/1976 | Tamesui et al. | 451/11 |
| 4,584,796 | 4/1986 | Yoneda et al. | 451/8 |
| 4,648,025 | 3/1987 | Yoneda et al. | 451/11 |
| 4,773,187 | 9/1988 | Ohta et al. | 451/11 |
| 4,934,106 | 6/1990 | Setzer | 451/9 |
| 5,076,022 | 12/1991 | Ohta et al. | 451/10 |
| 5,103,596 | 4/1992 | Fujii et al. | 451/10 |
| 5,371,975 | 12/1994 | Lundmark | 451/9 |

*Primary Examiner*—D. S. Meislin
*Assistant Examiner*—Eileen Morgan
*Attorney, Agent, or Firm*—Oblon, Spivak, McClelland, Maier & Neustadt, P.C.

[57] ABSTRACT

A numerical controlled grinding machine for grinding a workpiece, in which a thermal displacement taking place between a wheel head and the workpiece, is detected with the workpiece not being subjected to the bending due to a grinding resistance. The thermal displacement is calculated from the difference between the present position of the wheel head detected by a position detector and the theoretical position thereof converted from the diameter of the workpiece measured by an in-process measuring device. The position data for the wheel head stored in a numerical controller is compensated for the calculated thermal displacement for use in the subsequent control of feed movement between the workpiece and the wheel head.

11 Claims, 13 Drawing Sheets

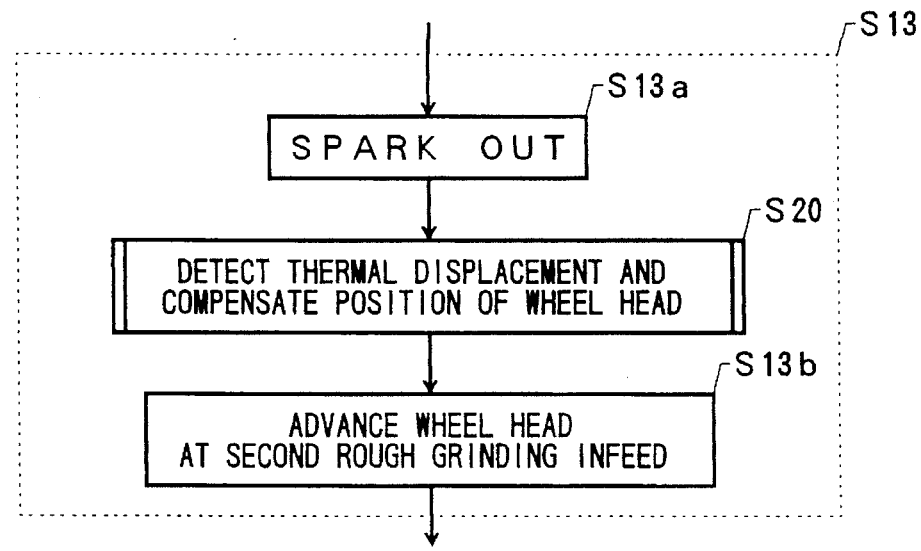
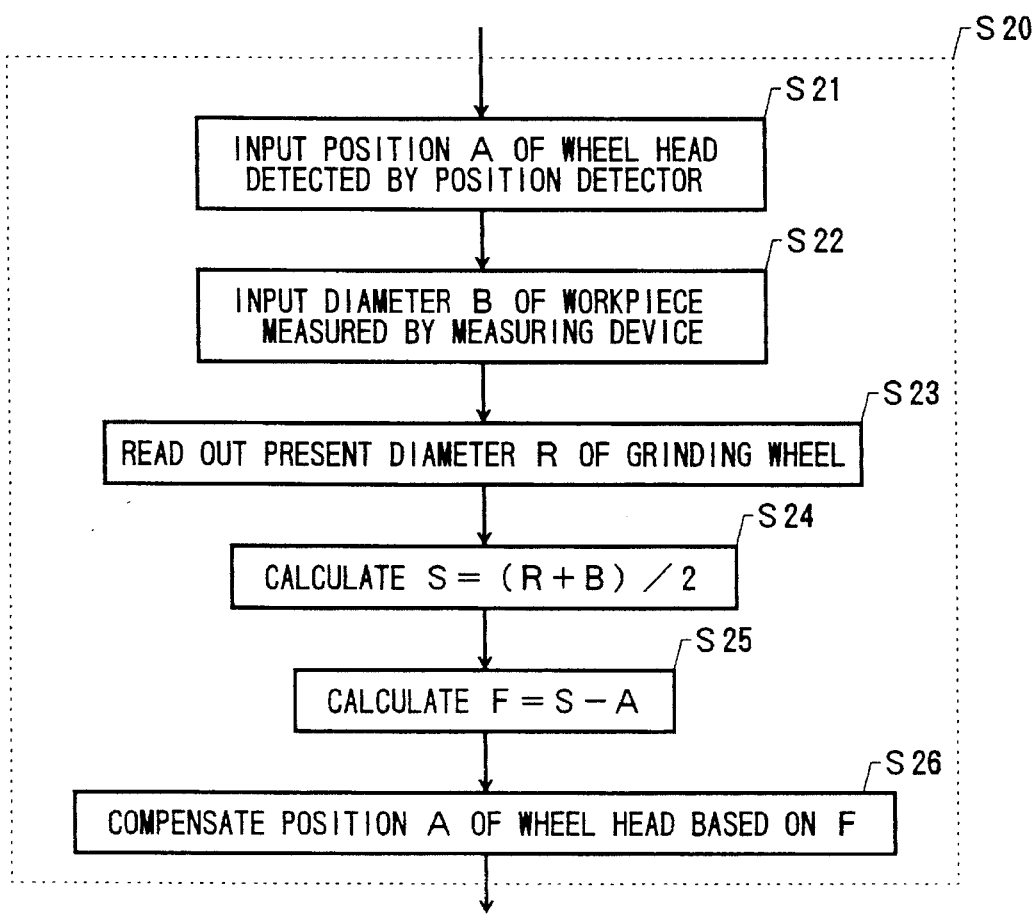

METHOD AND APPARATUS FOR GRINDING A WORKPIECE

BACKGROUND OF THE INVENTION

1. Field of the Invention

The present invention relates to an improved grinding method and apparatus for grinding a workpiece, and more particularly, relates to an improved grinding method and apparatus with a function for compensating a detected position of a wheel head for a thermal displacement.

2. Discussion of the Prior Art

Heretofore, in a conventional cylindrical grinding machine, a wheel head supporting a rotating grinding wheel 19 is advanced toward a workpiece W, so that cylindrical sections Wa, Wb and Wc of the workpiece W which is supported between a center 15a of a work head and a center 16a of a tailstock, are ground with the grinding wheel 19, as shown in FIG. 1. As shown in FIG. 2, the wheel head is infed as reducing its infeed rate in order such as at a rough grinding infeed rate G1, a fine grinding infeed rate G2 and a finish grinding infeed rate G3. Therefore, the workpiece W is ground with the grinding wheel 19, wherein the position of the wheel head is represented by the line G. Further, to compare the position of the wheel head with the diameter of the workpiece W, the diameter of the workpiece W is converted into a value S corresponding thereto. Namely, the value S represented by the line H is calculated by the following equation:

$$S = (R+B)/2$$

where, B represents the diameter of the workpiece W directly measured by an in-process measuring device (not shown), and R represents the diameter of the grinding wheel 19 which has been beforehand measured and stored in a numerical controller. However, it is general that the line G does not coincide with the line H at the end portions of the lines G and H. This is because there takes place a thermal displacement between the workpiece W and the wheel head with changes in the temperature of machine components.

For this reason, in a conventional grinding machine using the in-process measuring device for measuring the diameter of the workpiece W during the grinding operation, the difference d between the lines G and H indicated in FIG. 2 at the ending time of the finish grinding operation is calculated based on the diameter B of the workpiece W measured by the measuring device and the absolute position S of the wheel head detected by a suitable position detector. And, position data for the wheel head detected by the suitable position detector is compensated for the calculated difference d, whereby the error of the detected position data for the wheel head primarily due to the thermal displacement can be compensated for. In the successive grinding operations on the sections Wb and Wc of the workpiece W, the indirect-sizing grinding operation which does not use the in-process measuring device is carried out using the compensated position data for the wheel head. Therefore, in the successive grinding operations, the machining error caused by the thermal displacement can be diminished, and because of the indirect-sizing grinding operation, the machining time can be shortened.

However, the above-aforementioned difference d is influenced not only by the thermal displacement but also by the bending or flexing of the workpiece W due to the grinding resistance. Because the position of the wheel head involving the thermal displacement and the diameter of the workpiece W are detected or measured while the wheel head is being infed against the workpiece W and while the workpiece W is being bent by the grinding resistance, the diameter of the workpiece W cannot be measured accurately.

SUMMARY OF THE INVENTION

Accordingly, it is a primary object of the present invention to provide an improved grinding method and apparatus capable of detecting only the thermal displacement taking place between a workpiece and a wheel head, with the workpiece being not subjected to a bending or flexing.

It is another object of the present invention to provide an improved grinding method and apparatus capable of performing the compensation for a thermal displacement only when such thermal displacement compensation is required.

Briefly, a numerically controlled grinding apparatus according to the present invention comprises a wheel head rotatably carrying a grinding wheel, drive means for advancing and retracting the wheel head towards and away from a workpiece, position detection means for detecting the position of the wheel head relative to the workpiece, in-process measuring means for measuring the diameter of the workpiece during a grinding operation, a numerical controller for controlling the drive means in accordance with a numerical control program. The numerical controller includes bending control for controlling the drive means to reduce the bending of the workpiece at a selected time within the grinding operation, calculation means for calculating the thermal displacement of the machine by reference to the actual position of the wheel head and the diameter of the workpiece in which the bending of the workpiece is eliminated, and compensation means for compensating data detected by the position detection means to indicate the position of the wheel head, for the thermal displacement calculated by the calculation means.

With this configuration, the thermal displacement of the machine is calculated when the workpiece is not subjected to a bending due to the grinding resistance, so that the position of the wheel head can be compensated accurately for the thermal displacement of the machine.

In another aspect of the present invention, a processor of the numerically controlled grinding apparatus further determines whether or not the compensation for the thermal displacement is necessary based on predetermined criteria. Only when such compensation is necessary, the bending control means, the calculation means and the compensation means are brought into operation. This advantageously results in effectively performing the grinding operation in which the compensation is not required.

Further, according to the present invention, a grinding method is also provided in which the compensation of the wheel head position data for the thermal displacement is practiced in such a manner as described in connection with the aforementioned grinding apparatus.

BRIEF DESCRIPTION OF THE ACCOMPANYING DRAWINGS

Various other objects, features and many of the attendant advantages of the present invention will be readily appreciated as the same becomes better understood by reference to the following detailed description of preferred embodiments when considered in connection with the accompanying drawings, in which:

FIG. 6 is a flow chart of the details executed in step S13 of FIG. 5;

FIG. 7 is a flow chart of the details executed in step S20 of FIG. 6, for calculating the thermal displacement and for compensating position data indicative of the position of the wheel head, for the calculated thermal displacement;

Figure 5:
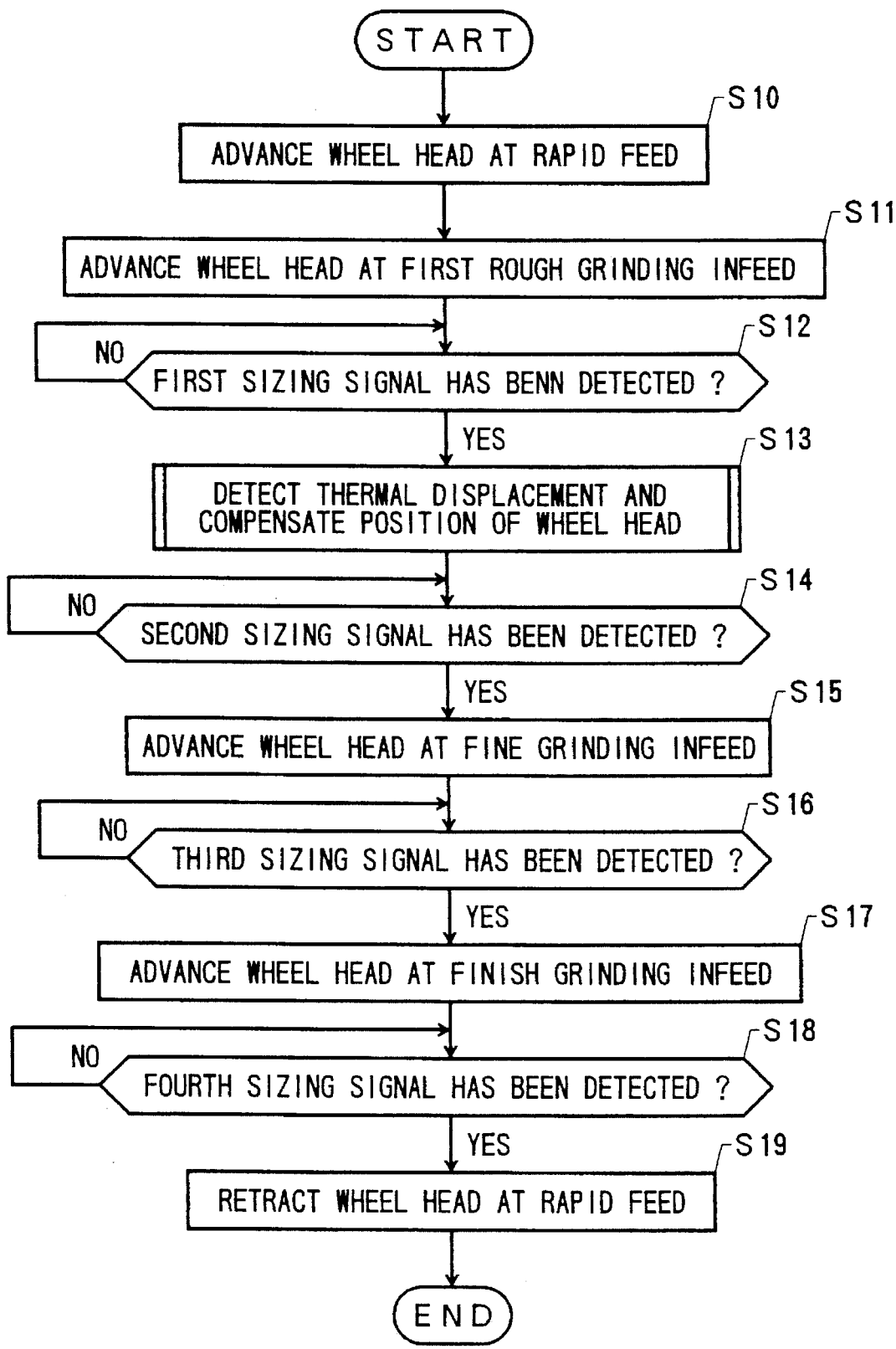
FIG. 5 is a flow chart of a subroutine showing a program for grinding a first section of a workpiece in a direct-sizing grinding mode.
Figure 8:
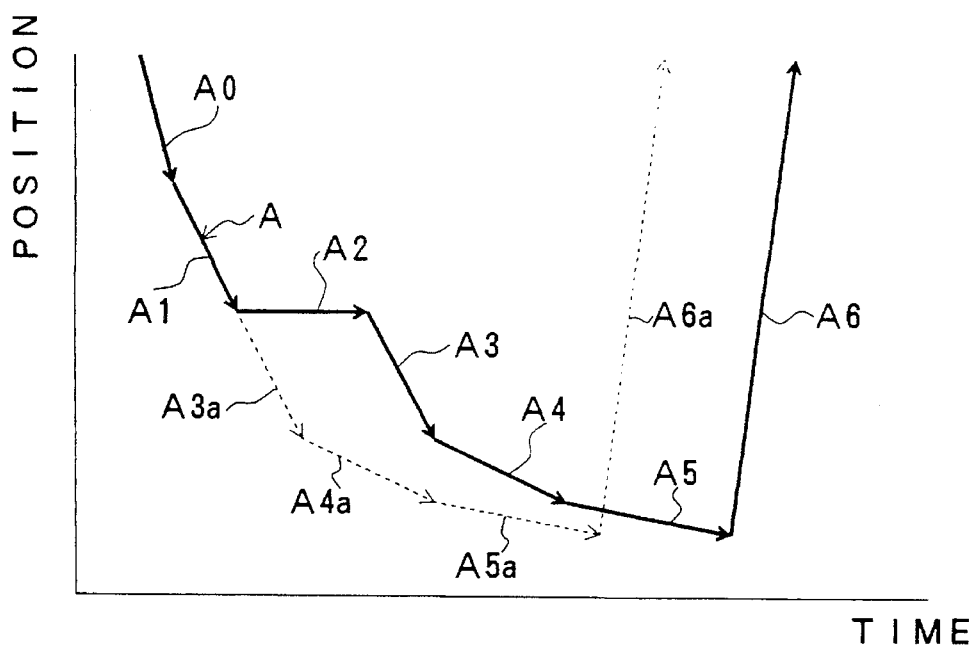
FIG. 8 is an explanatory chart showing the movement of the wheel head in the first embodiment according to the present invention.
Figure 16:
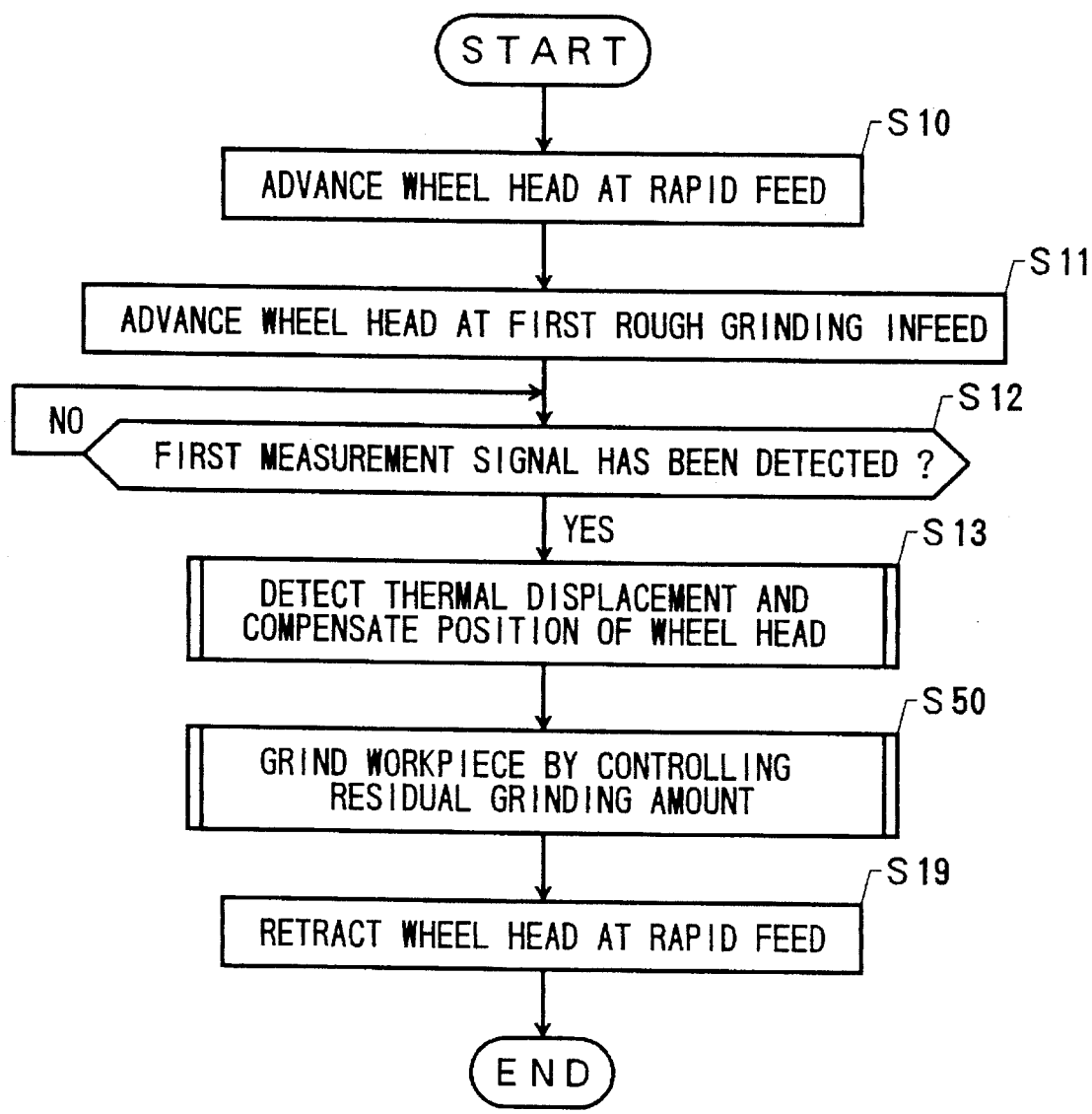
Figure 17:
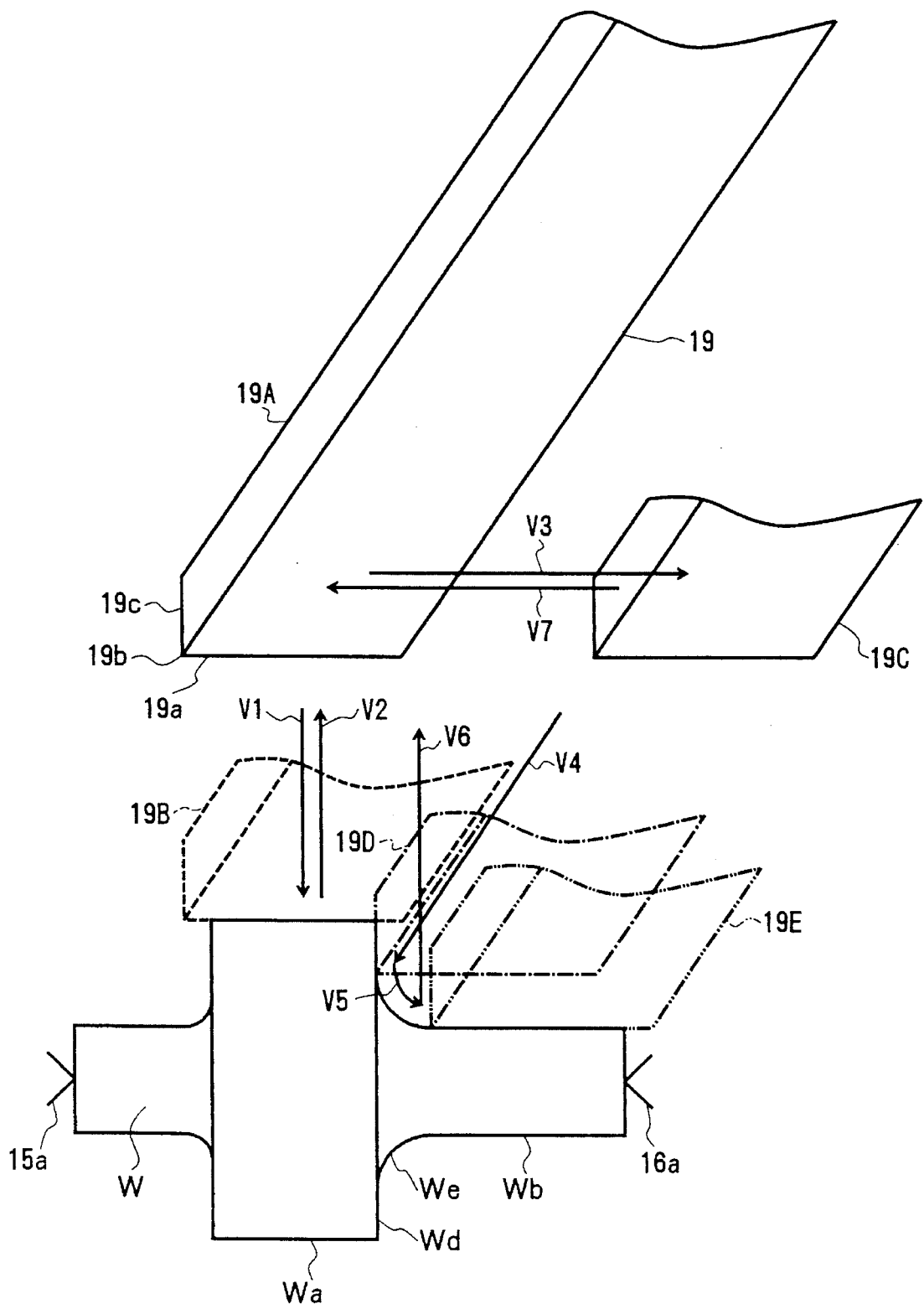

FIG. 16 is a flow chart substituted for that shown in FIG. 5, wherein the infeed rate of the wheel head is controlled depending upon the residual grinding amount in a third embodiment according to the present invention; and FIG. 17 is an explanatory view for the grinding operations wherein a shoulder surface, a rounded corner and a second section of a workpiece are ground one after another subsequently to a plunge grinding on a first section of the workpiece in a fourth embodiment according to the present invention.

DETAILED DESCRIPTION OF THE PREFERRED EMBODIMENTS

Preferred embodiments of the present invention will now be described with reference to the accompanying drawings.

First Embodiment

Figure 3:
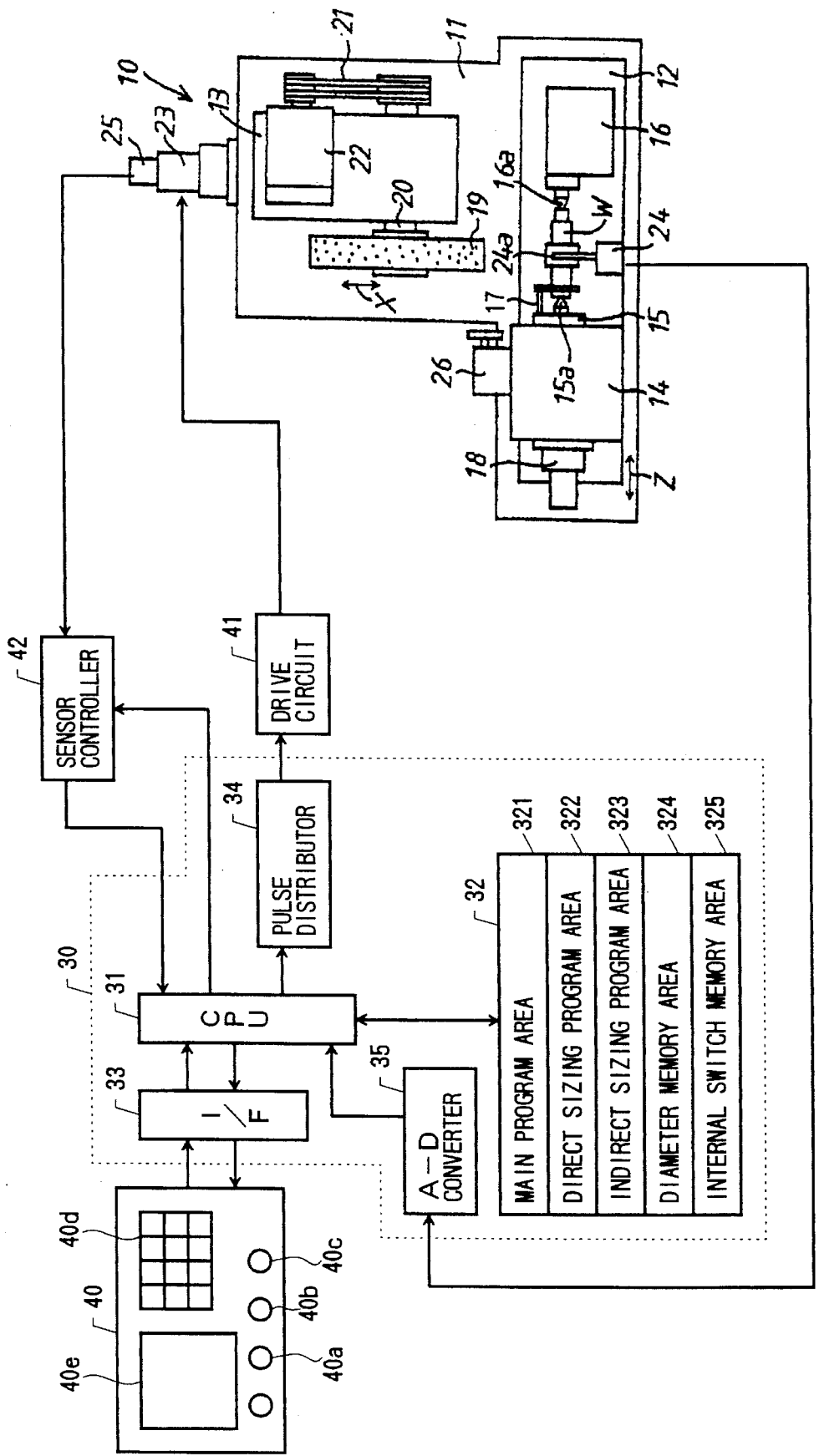
FIG. 3 is a block diagram of a numerical controller, also illustrating a plan view of a grinding machine according to the present invention.

Referring to FIG. 3, numeral 10 indicates a grinding machine in which a table 12 is slidably mounted on a bed 11 in the direction of Z-axis (a feed mechanism for the table is not shown). Mounted on the table 12 are a work head 14 which rotatably carries a work spindle 15 driven by a motor 18 arranged thereon, and a tailstock 16. Both ends of a workpiece W are supported by a center 15a of the work spindle 15 and a center 16a of the tailstock 16. The workpiece W is engaged with a drive pin 17 protruding from the work spindle 15 for bodily rotation with the work spindle 15.

Further, slidably mounted on the bed 11 in the direction of X-axis perpendicular to the Z-axis is a wheel head 13, on which a grinding wheel 19 such as CBN grinding wheel is rotatably supported by a wheel spindle 20 which is driven by a motor 22 through a V-belt mechanism 21. A servomotor 23 arranged on the bed 11 is controlled by a drive circuit 41 which responds to feed pulses distributed from a pulse distributor 34 of a numerical controller 30. The wheel head 13 is moved in the direction of the X axis through a ball screw mechanism (not shown). A position detector 25 such as absolute encoder detects the rotational angular position of the servomotor 23 relative to a reference angular position. Since the reference angular position is so set that the front edge of the grinding surface of the grinding wheel 19 is located on the rotational axis of the workpiece, in other words, since it is set to indicate zero when the grinding wheel 19 grinds the workpiece of zero diameter, the absolute position of the wheel head 13 is detected by the position detector 25. A detected value of the position detector 25 is input to the numerical controller 30 through a sensor controller 42. An in-process measuring device 24 mounted on the table 12 measures the diameter of one section being ground of the workpiece W and inputs a signal (analog signal) indicating the measured diameter to the numerical controller 30.

The numerical controller 30 comprises a central processing unit (CPU) 31 for controlling the grinding machine 10, a memory 32, an interface 33, and the pulse distributor 34 for distributing drive pulses in response to commands from the CPU 31. The CPU 31 is connected with the measuring device 24 through an A-D converter 35 and also with the sensor controller 42. The sensor controller 42 is responsive to compensation data from the CPU 31 so as to change the absolute position of the wheel head 13 with the compensation data. Connected with the interface 33 is an input device 40 having an emergency stop button 40a, a grinding start button 40b, a standby button 40c, a keyboard 40d for inputting various commands and data, and a CRT 40e.

In the memory 32, there are formed a main program area 321 storing a system control program for controlling the grinding machine 10, a direct-sizing program area 322 for storing a grinding program used in grinding the workpiece W in a direct-sizing mode, and an indirect-sizing program area 323 for storing another grinding program used in grinding the workpiece W in an indirect-sizing mode. The memory 32 further includes a diameter memory area 324 for storing a diameter R of the grinding wheel 19 and various data which will be described hereinafter, and an internal switch area 325 for storing internal switch data which will be described hereinafter. The diameter R of the grinding wheel 19 stored in the diameter memory area 324 is updated each time the grinding wheel 19 is trued by a truing device 26 on the work head 14.

The operation of the apparatus as constructed above will now be described with reference to FIGS. 4 through 12.

Figure 4:
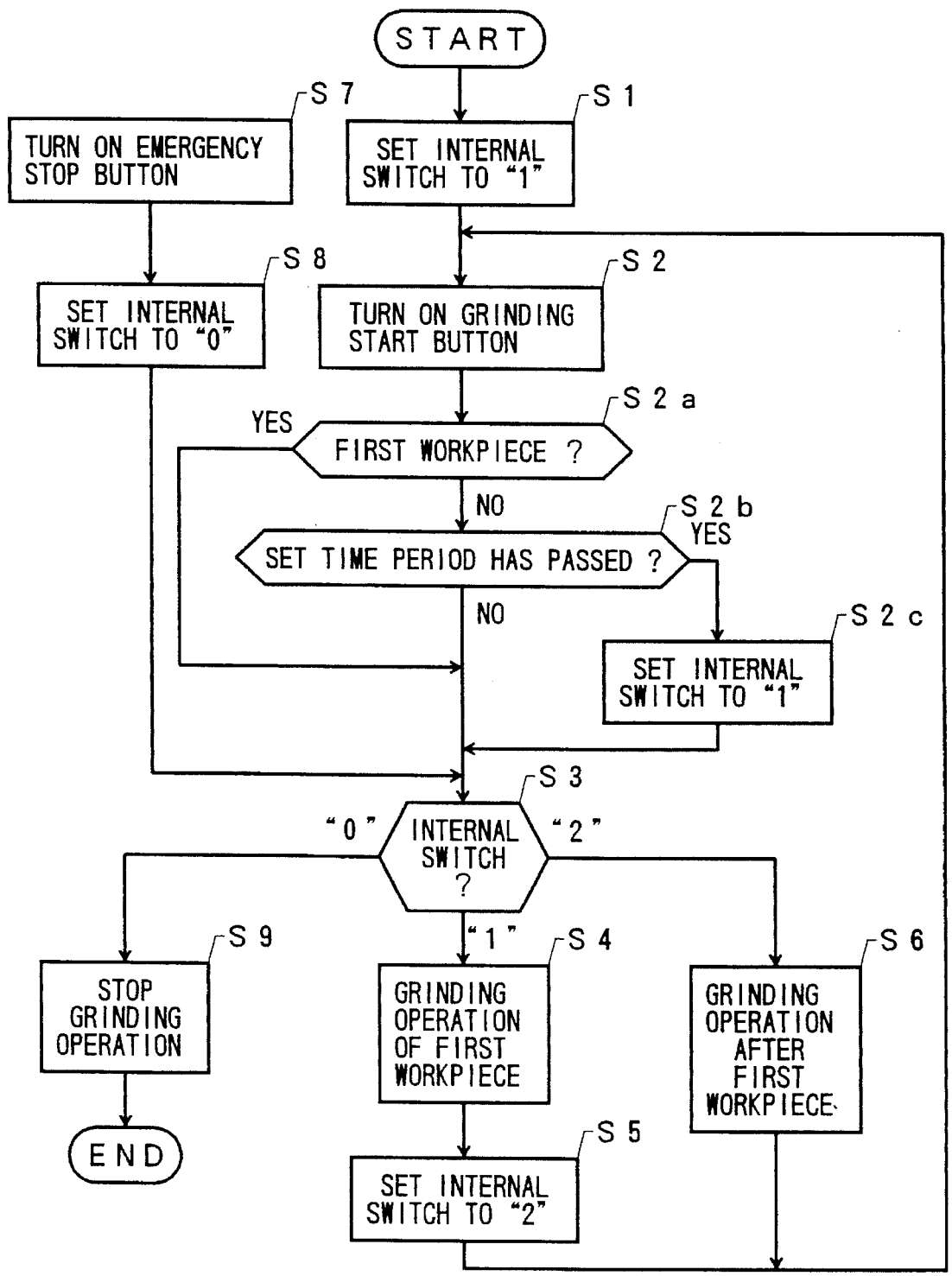
FIG. 4 is a flow chart showing a main program executed by a CPU 31 shown in FIG. 3, for controlling the grinding machine.

FIG. 4 shows a flow chart of the main or system control program for controlling the grinding machine 10. When the standby button 40c of the input device 40 is pushed, the CPU 31 initiates the execution of the main program and sets the internal switch to "1" in step S1. Then, the processing of the CPU 31 remains therein until the grinding start button 40b is pushed. When the workpiece W is set up on the grinding machine 10 and the grinding start button 40b is pushed, the processing advances to step S2a, wherein it is judged whether the workpiece W set up is the first one or not based on the status of the internal switch. When it is judged in step S2a that the workpiece set up is the first one, the processing advances to step S3. On the other hand, when it is judged that the workpiece set up is not the first one, the processing advances to step S2b. It is judged in step S2b whether or not a set time period has lapsed after the last grinding operation. This can be done by the use of a software timer function provided in the CPU 31 which starts the counting of the time period each time the grinding start button 40b is pushed. When the judgment in step S2b is "YES", the internal switch is set to "1" prior to the advancement to step S3. When the judgment in step S2b is "NO", the processing advances directly to step S3.

The set time period in step S2b is automatically varied in the following manner. Namely, it is set to be shorter when the temperature of the grinding machine 10 tends to change rapidly, for example after the daily operation start of the machine or upon the restarting of the machine after the machine stop for a substantial time period. However, the set time period is varied to be longer when the machine comes in a stable state in temperature. To be exact, it may be made longer as the number of grinding operation increases.

In step S3, the content of the internal switch area 325 of the memory 32 is read out, and when it is "1", the processing advances to step S4, wherein the grinding operation for the first workpiece is carried out in accordance with the direct-sizing grinding program stored in the direct-sizing program area 321 of the memory 32. The details for the grinding operation of the first workpiece will be described later. After the grinding operation for the first workpiece is completed, the processing advances to step S5 to set the internal switch to "2", and the processing returns to step S2. When the internal switch indicates "2", namely when the workpiece set up is not the first one and when the selected time period has lapsed after the last or preceding grinding operation, the processing advances to step S6, wherein the grinding operation for the second workpiece is carried out in accordance with another direct sizing grinding program for the second workpiece stored in the direct sizing program area 322 of the memory 32. It is therefore to be noted that the program area 322 of the memory 32 stores two kinds of direct-sizing grinding programs: one for the first workpiece and the other for the second workpiece. The details of the grinding operation for the second workpiece will be described later.

In the event that the emergency stop button 40a is pushed by the operator during the grinding operation (step S7), the processing advances to step S8 to set the internal switch to "0". The processing in step S8 is carried out taking preference over other processing. Thus, it is judged in step S3 that the internal switch indicates "0", and the processing advances to step S9, whereby CPU 31 executes the processing for emergency stop of the grinding machine before terminating this program.

The above-described system program is common to all the embodiments according to the present invention.

Next, the grinding processing executed in step S4 of FIG. 4 for the first section Wa of the first workpiece W will be described hereinafter with reference to FIGS. 5 through 9. As mentioned earlier, according to the present invention, this processing is executed when the machine is restarted after the stopping for a long time, to compensate the wheel head position data for thermal displacement of the machine.

Prior to carrying out step 10, the grinding wheel 19 and the workpiece W supported by the work head 14 and the tailstock 16 are rotated at predetermined speeds, respectively. In this situation, step S10 is executed, wherein the numerical controller 30 advances the wheel head 13 toward the workpiece W at a rapid feed rate to a position where the grinding wheel 19 comes close to the workpiece W (as shown by the line A0 in FIG. 8). More specifically, the CPU 31 decodes an instruction for advancing the wheel head 13 at a rapid feed rate. The instruction is written as a pulse distribution command and a rapid feed rate command in the first direct-sizing grinding program, and the decoded instruction to the pulse distributor 34. That is, the CPU 31 causes the pulse distributor 34 to output drive pulses to the drive circuit 41 until the wheel head 13 reaches a target position designated by the decoded instruction.

In successive step S11, as shown by the line A1, the wheel head 13 is further advanced at a programmed first rough grinding infeed rate until a first sizing signal is detected by the measuring device 24. The first sizing signal corresponds to a target diameter of the first section Wa with which the first rough grinding operation is finished. During this time, the position of the wheel head 13 detected by the position detector 25 changes progressively as the wheel head 13 is infed, and the detected position of the wheel head 13 is input to the CPU 31 through the sensor controller 42. At the same time, the diameter of the first section Wa is directly measured by a pair of probes 24a of the measuring device 24, and the measured diameter is output in the term of analog signal. The analog signal corresponding to the measured diameter is converted by the A-D converter 35 to digital data to be input to the CPU 31. In progress of the first rough grinding operation, when it is judged in step S12 that the first sizing signal has been detected, the first rough grinding operation is finished to advance the processing to step S13. The details of the processing in step S13 are shown in FIG. 6. In step S13a, the CPU 31 instructs the pulse distributor 34 to discontinue outputting feed pulses to the drive circuit 41, whereby the wheel head 13 is stopped at a position where the first sizing signal has been issued. From this time, a spark out grinding begins, as shown by the line A2 in FIG. 8.

In the first embodiment, the period for the spark-out grinding is set to a predetermined time "T1". That is sufficiently longer to reduce or remove the bending of the workpiece W which is caused by the grinding resistance in the first rough grinding operation. Preferably, the spark-out time T1 during which spark-out grinding is performed is arbitrarily set by the operator, taking the sharpness of the grinding wheel 19 and materials of the workpiece W into consideration. Upon completion of the spark-out grinding, the CPU 31 executes the processing in step S20 for calculating the thermal displacement of the machine and for compensating the position data of the wheel head 13 for the calculated displacement, as described hereinafter.

Figure 1:
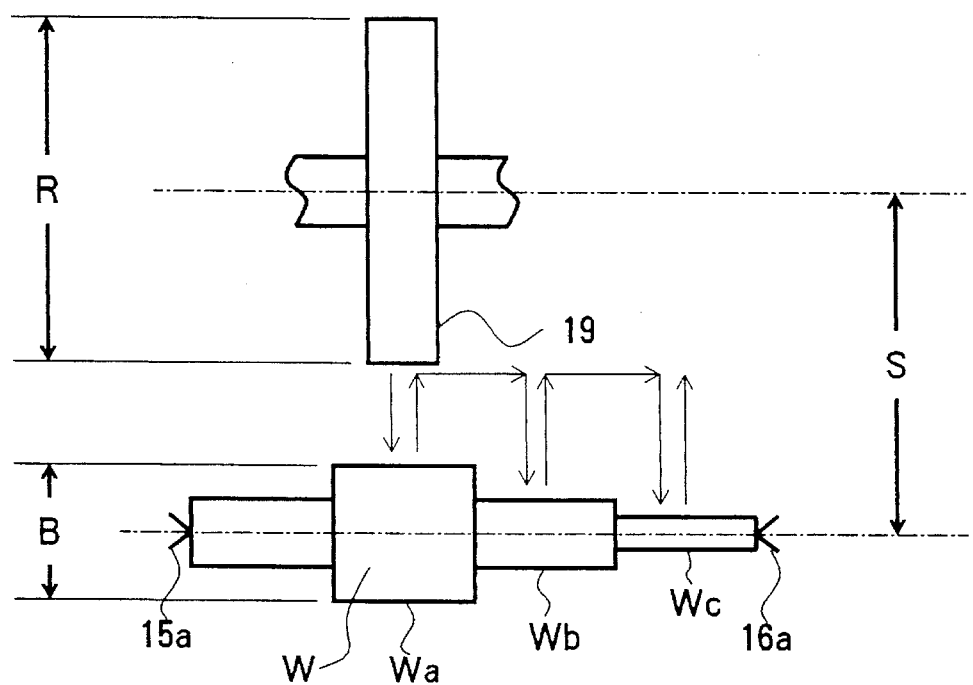
FIG. 1 is an explanatory view showing the relationship between the positions of a grinding wheel and a workpiece.
Figure 2:
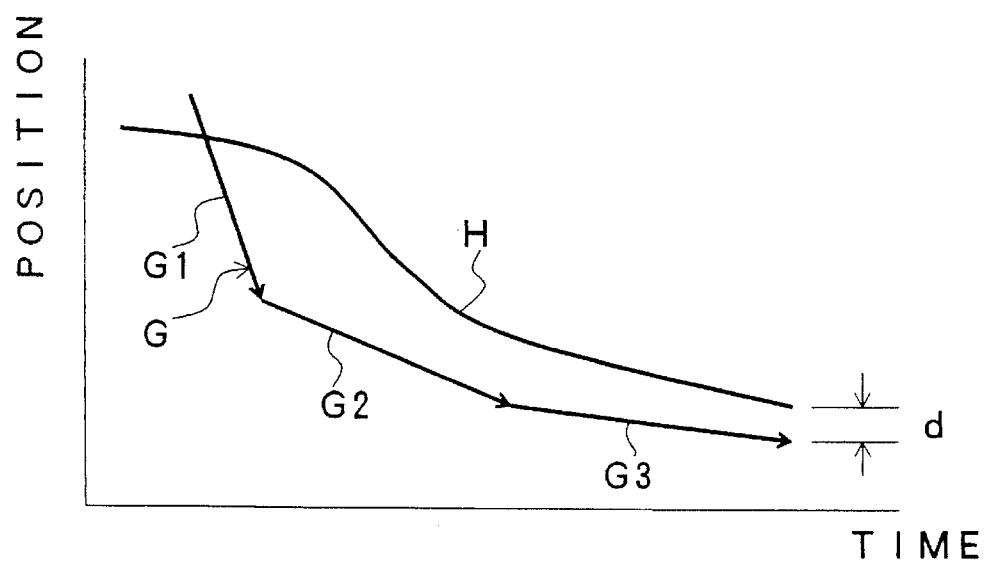
FIG. 2 is an explanatory chart showing the relationship between the position of the wheel head and the diameter of the workpiece.

Prior to describing the processing in step S20 shown in FIG. 7, the relationship between the diameter B of the section Wa measured by the measuring device 24 and the position S of the wheel head 13 detected by the position detector 25, is explained with reference to FIG. 1.

In an ideal case that no thermal displacement occurs between the wheel head 13 and the workpiece W and that no bending of the workpiece is caused by the grinding resistance, the relationship between the diameter B detected when the grinding wheel 19 is in slight contact with the section Wa and the position S is represented by the following equation:

$$S - R/2 = B/2 \qquad (1)$$

where, R represents the diameter of the grinding wheel 19 stored in the diameter memory area 324 which diameter is updated every time the grinding wheel 19 is subjected to a truing or dressing operation. However, the equation (1) does not apply when the thermal displacement occurs. Therefore, the thermal displacement is calculated in the method described hereinafter.

Referring back to the flow chart shown in FIG. 7, this processing is carried out with the grinding wheel 19 being in slight contact with the first workpiece section Wa, but with the grinding resistance being able to be substantially ignored. Input to the CPU 31 in steps S21, S22 and S23 are the position A of the wheel head 13 detected by the position detector 25, the diameter B of the section Wa measured by the measuring device 24, and the diameter R of the grinding wheel 19 stored in the diameter memory area 324, respectively. In step S24, the CPU 31 calculates S representing the wheel head position in the ideal state wherein the thermal displacement and the bending of the workpiece do not exist, by the following equation:

$$S = (R+B)/2 \qquad (2)$$

In successive step S25, the thermal displacement amount F is calculated by the CPU 31 using following equation:

$$F = S - A \qquad (3)$$

And, in step S26, the CPU 31 outputs the calculated amount F to the sensor controller 42 to compensate the data A indicative of the wheel head position for the calculated amount F by adding F to A2 to indicate a position at the start of A3 at time Ab in FIG. 9, as discussed hereinafter. Thus, after the compensation, the position data A for the wheel head 13 indicates the actual position to which the wheel head 13 has been moved due to the thermal displacement. Step S26 is followed by steps S13 and S14 for the second rough grinding infeed operation.

Figure 9:
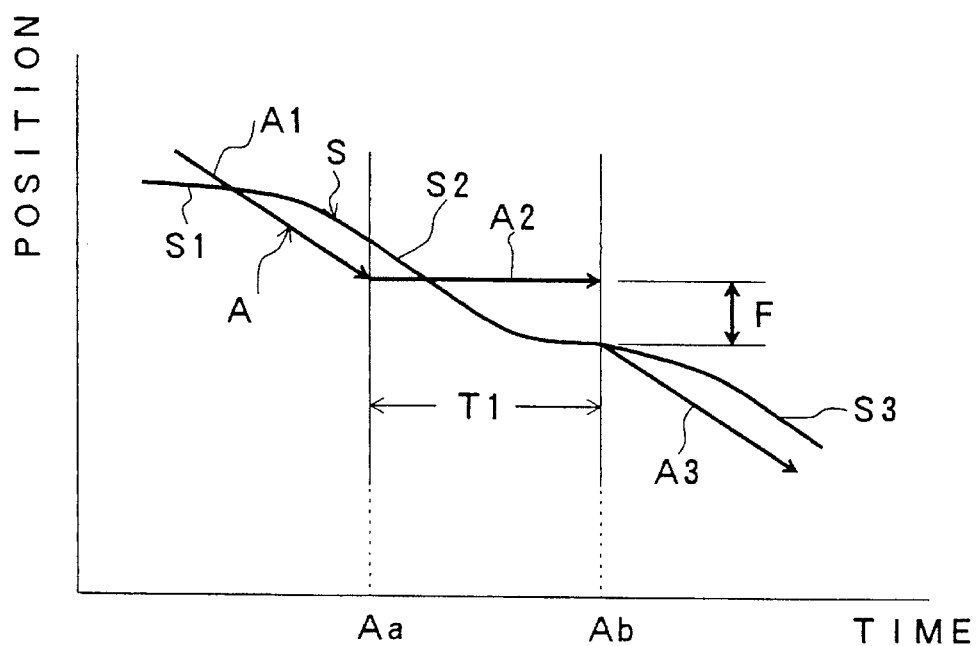
FIG. 9 is a chart showing the output of a position detector for the wheel head and the output of an in-process measuring device when the wheel head is around the position A2 shown in FIG. 8.

Referring to FIG. 9, the line A represents the position data A for the wheel head 13 detected by the position detector 25, and the line S represents the position data S for the wheel head 13 which is calculated from the actual diameter B of the section Wa by the use of the equation (2). In the first rough grinding operation, the position data A decreases as shown by the line A1, while the position data S decreases as shown by the line S1 as the grinding wheel 19 grinds the workpiece W. When the first sizing signal is detected at time Aa, the wheel head 13 is stopped as shown by the line A2, so that the position data A does not change. The spark-out grinding is carried out with the wheel head 13 remaining stopped. However, the section Wa of the workpiece W is gradually ground by a spring back of the workpiece W, so that the position data S decreases gradually as shown by the line S2. Thereafter, the spark-out grinding is finished at time Ab. Since the processing shown in FIG. 7 is carried out at the time Ab, the position data A detected by the position detector 25 is brought into coincidence with the position data S, to indicate a theoretical wheel head position dependent upon the actual diameter B of the workpiece. Namely, F is added to the position data A2 so that A2 is shifted to A3 at the time Ab as shown in FIG. 9, thereby compensating the measured wheel head position for thermal displacement. Therefore, subsequent second rough grinding operation, fine grinding operation and finish grinding operation are performed by reference to the compensated position data A. In the first embodiment, the second rough grinding infeed rate is similar to the first rough grinding infeed rate. The wheel head 13 is moved as shown by the line A3 in FIG. 8, so that the first section Wa is further ground. During this operation, when it is judged in step S14 of FIG. 5 that a second sizing signal has been detected by the measuring device 24, the second rough grinding operation is terminated. Thereafter, the processing moves to step S15, and a fine grinding operation is started therein. The fine grinding operation is carried out until a third sizing signal is detected by the measuring device 24 (step S16), as shown by the line A4, and then the finish grinding operation is carried out until a fourth sizing signal is detected by the measuring device 24. Thereafter, the wheel head 13 is retracted at a rapid feed rate in step S9 as shown by the line A6, whereby the grinding operation for the first section Wa of the workpiece W is completed.

Figure 10:
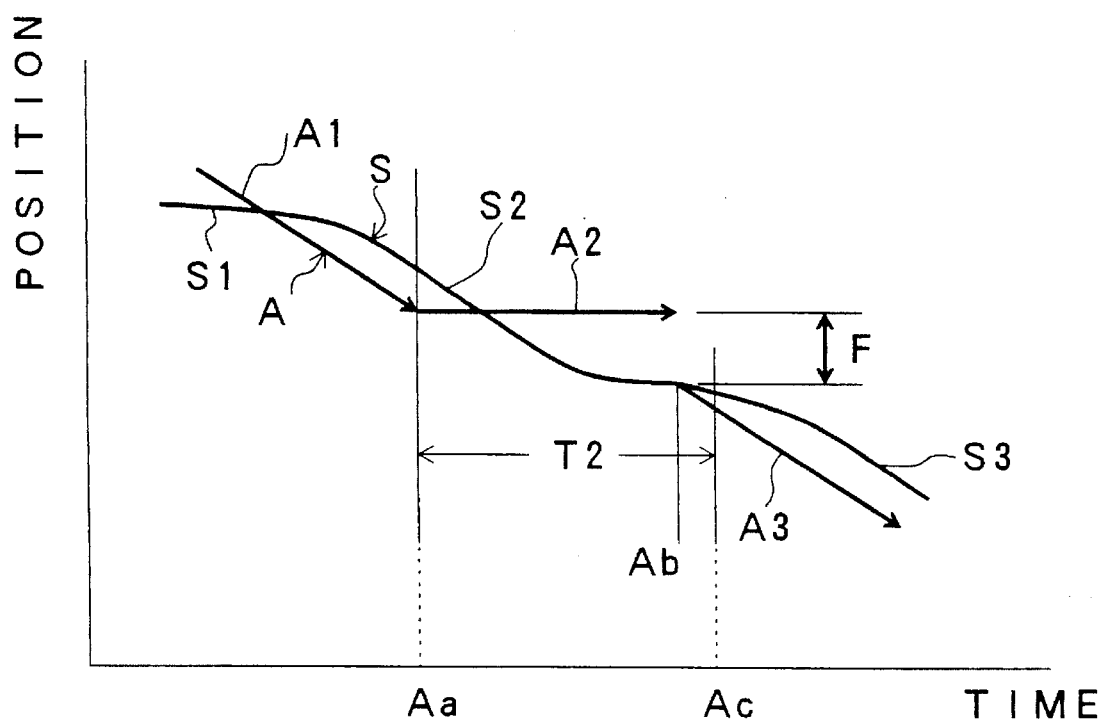
FIG. 10 is a chart similar to that shown in FIG. 9, but showing such a chart as used in a modified form of the first embodiment.

In the first embodiment, the spark-out in step S13a shown in FIG. 6 is finished when the spark-out time T1 lapses. However, in a modified form of the embodiment, the spark-out grinding may be completed when the change in the diameter measured by the measuring device 24 per workpiece rotation or within a unit time period becomes smaller than a predetermined tolerance. In this modification, the spark-out time is set as T2 which is longer than the aforementioned time T1, as shown in FIG. 10. If the change in the workpiece diameter R does not become smaller than the predetermined tolerance within the time T2, an alarm signal may be issued and the wheel head 13 may be retracted immediately at the expiration of the time T2.

Next, a second or other section of the same workpiece is ground as follows. Prior to grinding the second section Wb, the table 12 is moved to a position where the grinding wheel 19 faces to the second section Wb.

In this case, the grinding of the second section may be performed in the indirect-sizing mode in which the measuring device 24 is not used. Because the position data A for the wheel head 13 detected by the position detector 25 has been compensated for the thermal displacement in the previous grinding operation for the first workpiece section Wa, the second workpiece section Wb can be precisely ground without the use of the measuring device 24.

Figure 11:
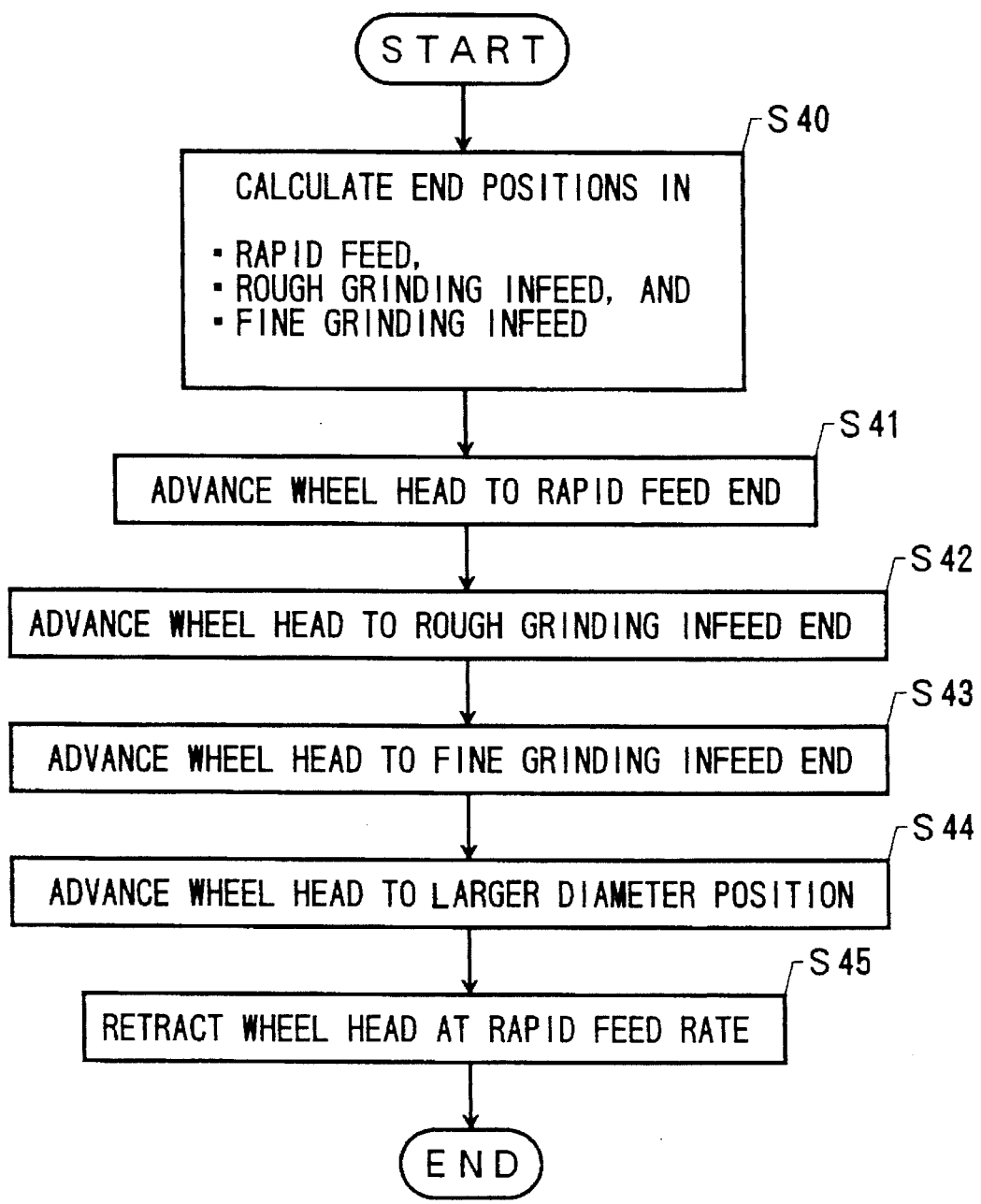
FIG. 11 is a flow chart executed by the CPU 31 shown in FIG. 3 for grinding one or more other sections of the workpiece in an indirect-sizing mode after the grinding of the first section of the workpiece in the direct-sizing mode.

The grinding processing in the indirect-sizing mode will be now described hereinafter with reference to FIG. 11.

When it is judged in step S3 shown in FIG. 4 that the internal switch indicates "2", step S40 is then executed, in which the CPU 31 calculates respective end positions of the wheel head 13 in rapid feed, rough infeed and fine infeed based on the present retracted position of the wheel head 13 and the target finish diameter of the second section Wb. Then, the wheel head 13 is advanced to the rapid feed end position at the rapid feed rate in step S41, to the rough infeed end position at a rough infeed rate in step S42, to the fine infeed end position at a fine infeed rate in step S43 and finally, to the target diameter position at a finish infeed rate in step S44. The wheel head 13 is then retracted to the retracted position. A rapid feed amount, a rough infeed amount and a fine infeed amount are stored in memory 32 beforehand, and these data are used in calculating the respective end positions of the wheel head 13.

Although in this embodiment, respective infeed end positions of the wheel head 13 are calculated in step S40, they may be designated in a grinding program section for the second workpiece section Wb and stored in the indirect-sizing program area 322 of the memory 32.

Figure 12:
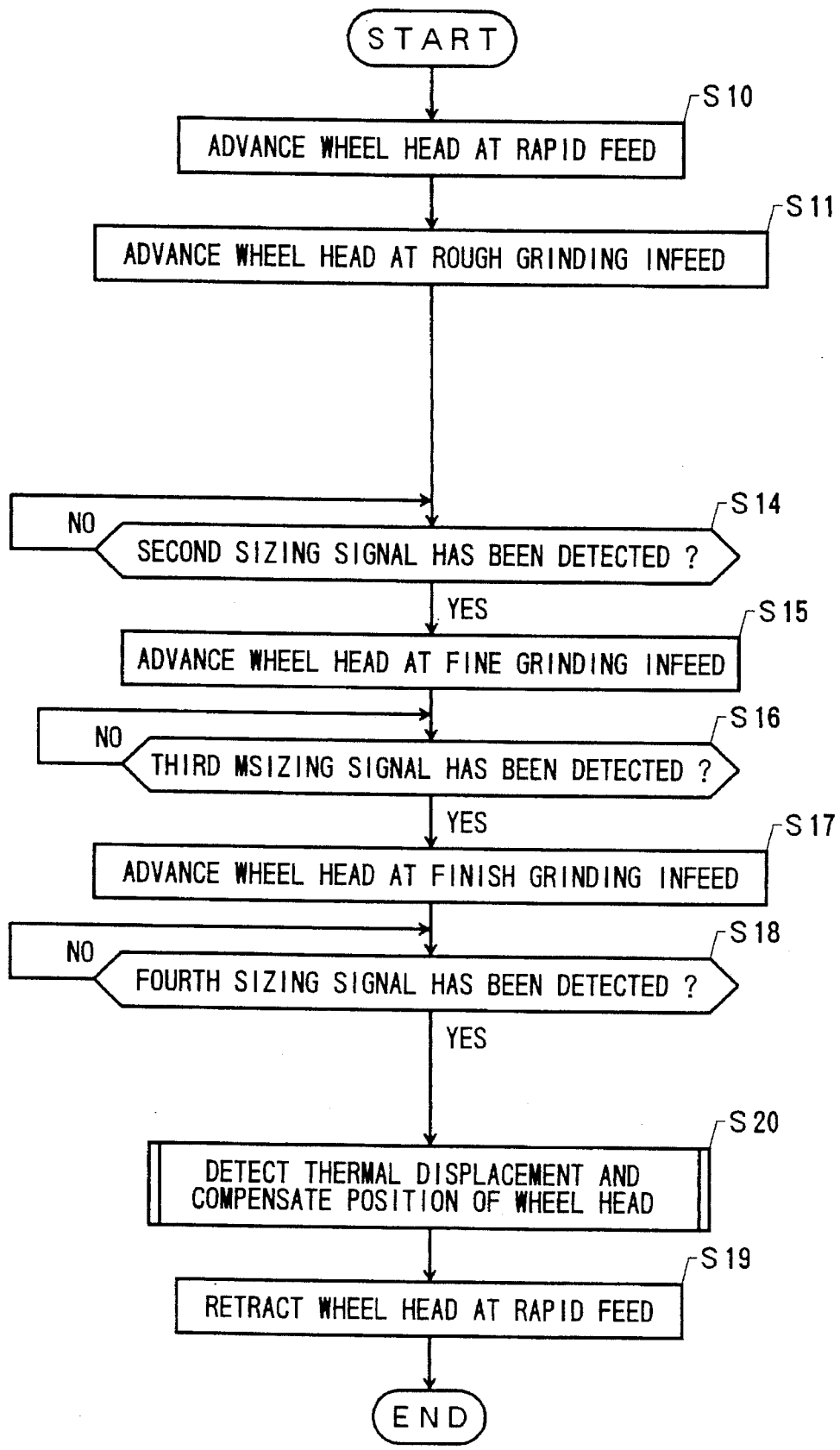
FIG. 12 is a flow chart of those in step S6 of FIG. 4, executed in grinding a first section of second or other successive workpieces.

When a first section of the second workpiece is ground, the processing shown in FIG. 12 is executed in step S6 in FIG. 4. In this processing, step S10, S11, S14 through S18 and S19 respectively corresponds to those which are identified by the same reference numerals in FIG. 5. However, steps S12 and S13 of FIG. 5 are omitted so that the processing for detecting thermal displacement and for compensating the position of the wheel head 13 is not carried out in the rough grinding operation and that the rough grinding operation is carried out once only.

Further, during the finish grinding, processing are executed in step S20 in the same manner as was described with reference to FIG. 7.

Accordingly, the position data A for the wheel head 13 detected by the position detector 25 is again compensated for the thermal displacement of the machine which has taken from the time when the first section of the first workpiece was ground, until this time. This advantageously results in improving the grinding accuracy of second and other successive sections of the second workpieces in the indirect-sizing mode.

Second Embodiment

Figure 13:
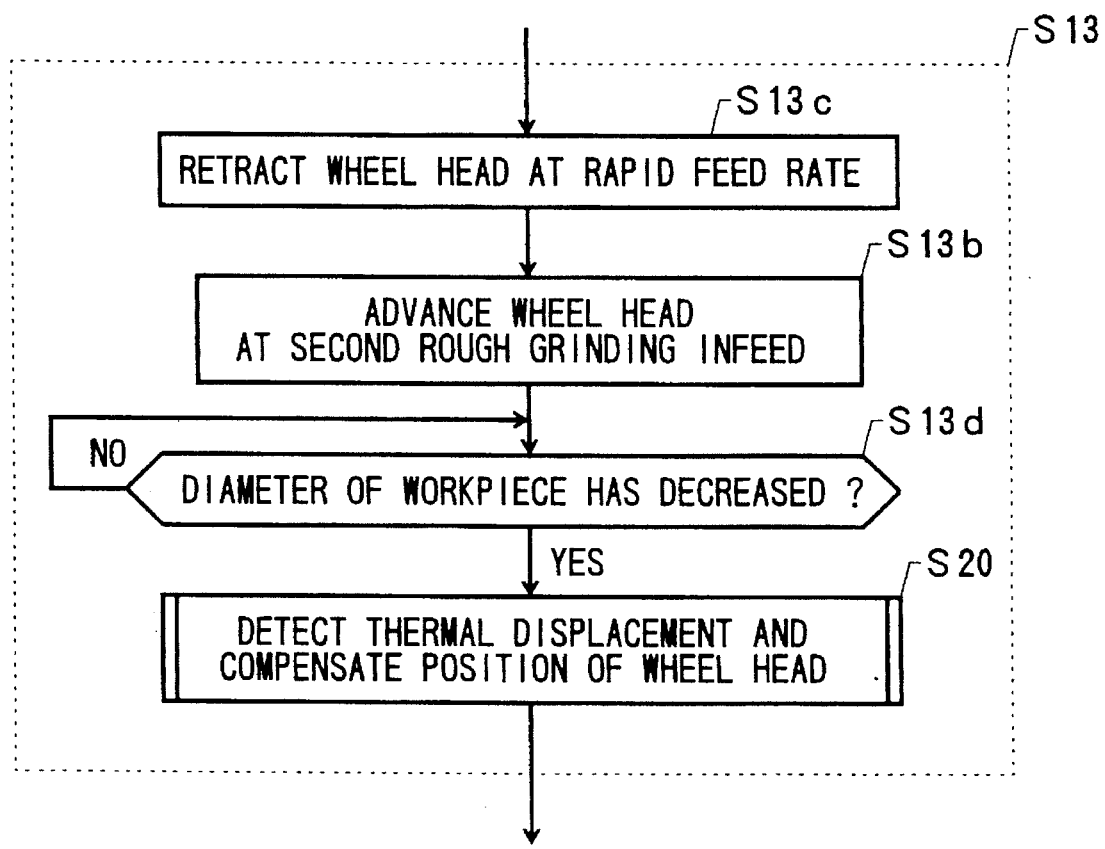
FIG. 13 is a flow chart of steps substituted for those shown in FIG. 6, executed for removing the bending of the workpiece by retracting the wheel head in a mid course of a grinding operation in a second embodiment according to the present invention.
Figure 14:
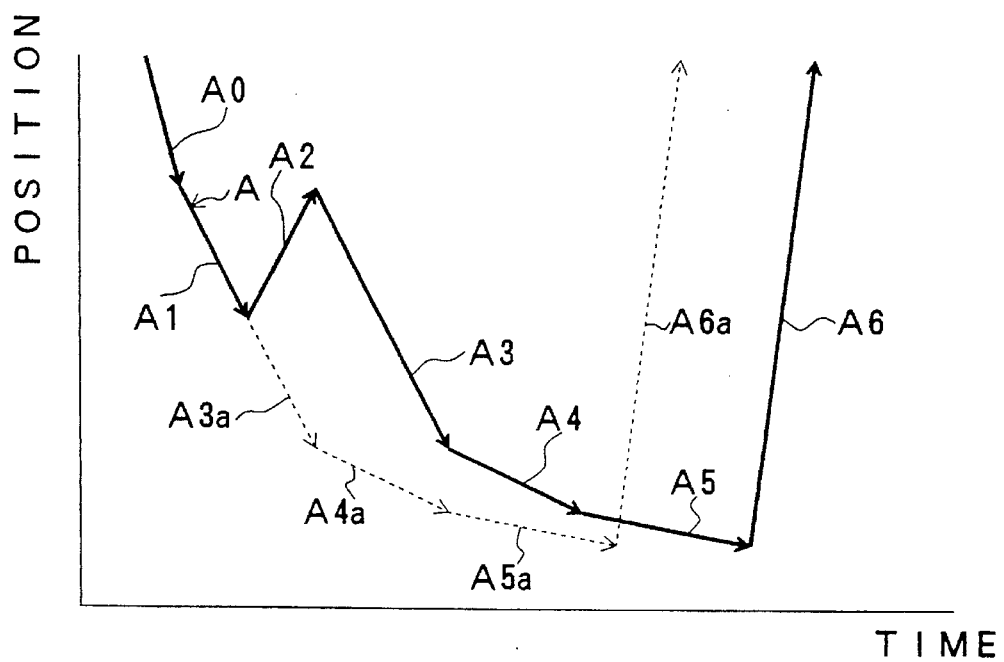
FIG. 14 is a chart similar to that shown in FIG. 8, but in the second embodiment according to the present invention.
Figure 15:
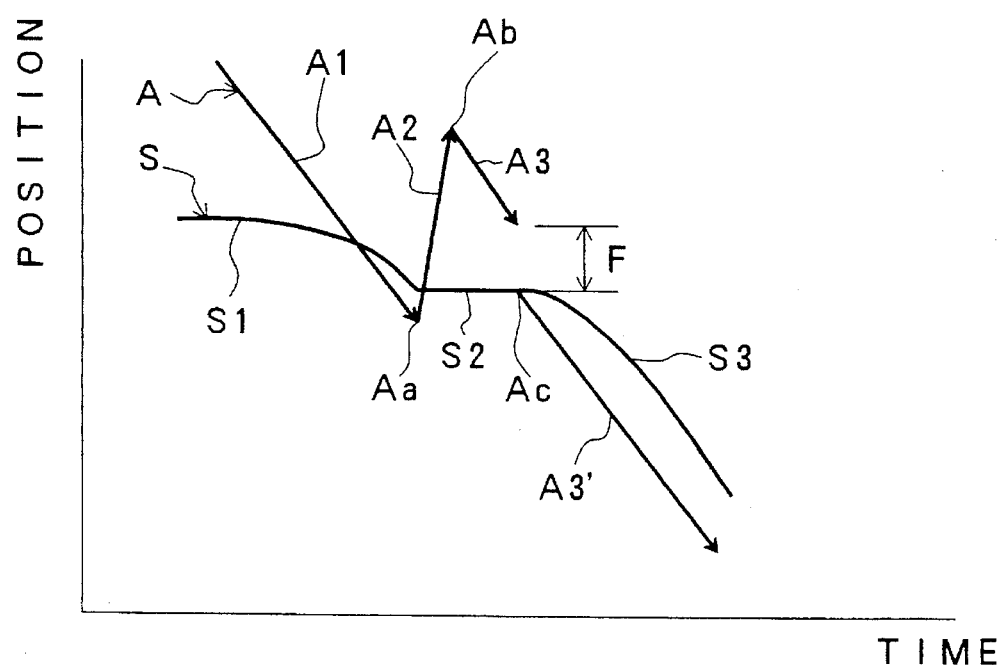
FIG. 15 is a chart similar to that shown in FIG. 9, but in the second embodiment according to the present invention.

Processing according to the second embodiment according to the present invention will be described with reference to FIGS. 5 through 7. In the second embodiment, the processing shown in FIG. 6 is replaced by those shown in FIG. 13. Namely, when the processing shown in FIG. 5 are executed in step S4 of FIG. 4, step S13 of FIG. 5 is executed as those processing in FIG. 13. Therefore, upon the completion of the grinding on the first workpiece section Wa of the first workpiece W, step S13c of FIG. 13 is reached to retract the wheel head 13 from the position Aa to the position Ab (back-off position) through a predetermined distance at a rapid feed rate, as shown by line A2 in FIG. 15. In an alternative form, instead of being retracted through the predetermined distance, the wheel head 13 may be retracted up to such a back-off position that diameter B of the first workpiece section Wa being measured by the measuring device 24 is changed notably and then remains unchanged. As soon as the back-off position is reached, the wheel head 13 is again advanced towards the first workpiece section Wa at the second rough grinding infeed rate which is similar to the first rough grinding infeed rate in this embodiment, so that the second rough grinding operation is started as shown by the line A3 in FIG. 15. In the process of the second rough grinding operation, the processing moves to step S13d to judge whether or not the diameter of the first workpiece section Wa measured by the measuring device 24 has been changed, by reference to the output of the measuring device 24. At the same time, the diameter of the first workpiece section Wa changes at position Ac, and the processing in step S20 of FIG. 7 is carried out in parallel time relation with the second rough grinding operation. Consequently, the position data A for the wheel head 13 is shifted to indicate the position Ac from the line A3 to the line A3'. Subsequently, the processing of steps S14 through S19 are performed as described above.

It is to be noted that the second embodiment is particularly advantageous in that the compensated position data for the wheel head 13 does not involve the errors caused by the flexing or bending of the workpiece W.

Third Embodiment

The third embodiment is further improved in that infeed rates of the wheel head 13 during at least one of the second rough grinding operation, the fine grinding operation and the finish grinding operation is controlled depending upon the residual grinding amount (the reminder of the grinding allowance). This infeed rate control is performed in step S50 of FIG. 16 following step S13 in which as described previously, the position data A for the wheel head 13 is compensated for the thermal displacement of the machine upon completion of the first rough grinding operation. Briefly, by the processing in step S50, the residual grinding amount is calculated on a real time basis from the difference between a theoretical radius of the workpiece and a measured radius of the workpiece W each time, e.g., the workpiece makes one full-turn.

The detailed manner of the feed rate control and the attendant advantages thereof have been fully described in a co-pending U.S. application Ser. No. 08/037,591 filed on Mar. 26, 1993 of the same assignee of this application. Therefore, the disclosures in the U.S. application relating to the feed rate control of the wheel head depending on the residual grinding amount are incorporated in this application.

Fourth Embodiment

In this embodiment, the main program shown in FIG. 4 is used. As shown in FIG. 17, after a first section Wa is ground in the direct-sizing mode as was described in the first and third embodiments, a shoulder surface Wd, a rounded corner surface We and a second section Wb are successively ground in the indirect-sizing mode which does not use the in-process measuring device 24. In a grinding machine used in this embodiment, a grinding wheel 19 supported on a wheel head 13 (not shown) is rotatable about an axis which intersects the rotational axis of the workpiece at an acute angle. The first section Wa and the second section Wb are ground by a grinding surface 19a extending in the direction Z, while the shoulder surface Wd and the rounded corner surface We are ground respectively by another grinding surface 19c and an apex or corner edge 19b of the grinding wheel 19. In grinding the surfaces Wa, Wd, We and Wb of the workpiece W, the grinding wheel 19 is moved relative to the workpiece W as indicated by the arrows V1, V2, V3, V4, V5, V6 and V7 in FIG. 17.

Because the position data A for the wheel head 13 (not shown) is compensated for the thermal displacement of the machine during the grinding of the first section Wa as described in the first and third embodiments, it precisely represents the theoretical position of the wheel head 13, whereby the successive shoulder surface Wd, rounded corner surface We and second section Wb can be precisely ground even in the indirect-sizing mode.

The causes of the displacement include not only the thermal displacement in the feed screw, wheel head per se or the like, but also other factors such as, e.g., the wear of the grinding wheel. According to the present invention, the position data for the wheel head can be compensated for the thermal displacement as well as such other factors.

Obviously, numerous modifications and variations of the present invention are possible in light of the above teachings. It is therefore to be understood that within the scope of the appended claims, the present invention may be practiced otherwise than as specifically described herein.

What is claimed is:

1. A method for grinding a workpiece comprising the steps of:

(1) rotating a grinding wheel and said workpiece about respective rotational axes thereof;

(2) effecting relative movement between said grinding wheel and said workpiece;

(3) detecting a relative position between said grinding wheel and said workpiece;

(4) storing the detected relative position as present position data in a storage means;

(5) updating the stored present position data as the relative position between said grinding wheel and said workpiece is changed;

(6) measuring a diameter of said workpiece;

(7) controlling relative feed movement between said grinding wheel and said workpiece so as to reduce bending of said workpiece at a predetermined grinding stage;

(8) compensating the present position data stored in said storage means based on the measured diameter of said workpiece, for a displacement between the grinding wheel and the workpiece when the bending of said workpiece is reduced;

(9) storing the compensated present position data corresponding to an actual relative position free from said displacement between said grinding wheel and said workpieces in the storage means; and

(10) controlling the relative feed movement between said grinding wheel and said workpiece based on the actual relative position using the compensated present position data stored in said storage means, so that the accuracy of grinding of said workpiece ground in accordance with a numerical control program is not affected by the displacement between said grinding wheel and said workpiece.

2. A method according to claim 1, wherein said step (7) comprises:

a step of discontinuing the relative feed movement between said grinding wheel and said workpiece in a mid course of grinding said workpiece; and a step of subsequently resuming said relative feed movement.

3. A method according to claim 1, wherein said step (7) comprises:

a step of retracting said grinding wheel relative to said workpiece so as to disengage said workpiece from said grinding wheel; and a step of subsequently advancing said grinding wheel towards said workpiece so as to resume the grinding operation of said workpiece.

4. A method according to claim 1, wherein said step (10) comprises a step of controlling the infeed rate of said grinding wheel against said workpiece in connection with an amount of said workpiece remaining to be ground.

5. A method according to claim 1, further comprising a step of:

executing the steps (7), (8) and (9) if the workpiece is a first one to be ground.

6. A method according to claim 1, further comprising steps of:

measuring the time period between present and previous grinding operations; and executing the steps (7), (8) and (9) depending upon the time period measured.

7. A grinding apparatus for grinding a workpiece, comprising:

a wheel head rotatably supporting a grinding wheel;

workpiece supporting means for rotatably supporting said workpiece;

drive means for effecting relative movement between said wheel head and said workpiece;

position detection means for detecting a position of said wheel head relative to said workpiece;

measuring means for measuring a diameter of said workpiece during a grinding operation of said workpiece; and a numerical controller for controlling said drive means in accordance with a numerical control program, said numerical controller including:

feed control means for controlling a relative movement so as to reduce bending of said workpiece in a predetermined grinding stage;

storage means for storing position data indicative of the position of said wheel head detected by said position detection means and updating the stored position data as a relative position between said wheel head and said workpiece changes;

first calculating means for calculating a displacement between said wheel head and said workpiece, based on the diameter of said workpiece which is measured by said measuring means with said workpiece not being subjected to a bending and based on the stored position data;

compensation means for compensating the stored position data stored in said storage means for the displacement calculated by the first calculation means;

said storage means storing the compensated position data which correspond to an actual position of said wheel head, and said feed control means controlling the relative feed movement between the grinding wheel and the workpiece based on the actual relative position using the compensated position data stored in the storage means, so that the accuracy of grinding of the workpiece ground in accordance with a numerical control program is not affected by the displacement between the grinding wheel and the workpiece.

8. A grinding apparatus according to claim 7, wherein said numeral controller further comprises:

judgement means for judging based on at least one criteria whether or not the compensation of the displacement necessary and for operating said first calculation means and said compensation means only when the compensation for the displacement is judged by said judgement means to be necessary.

9. A grinding apparatus according to claim 7, wherein said feed control means operates to discontinue the infeed movement of said wheel head against said workpiece so as to effect a spark-out grinding.

10. A grinding apparatus according to claim 7, wherein said feed control means operates to effect a back-off movement so as to retract said wheel head from said workpiece and then, to resume the infeed movement of said wheel head against said workpiece.

11. A grinding apparatus according to claim 7, further comprising:

second calculation means for calculating a grinding amount remaining to be performed based on a difference between a theoretical radius of said workpiece and a measured radius of said workpiece measured by said measuring means; and said feed control means being responsive to said grinding amount calculated by said second calculation means for controlling the infeed rate of said wheel head against said workpiece in relation to said grinding amount calculated by said second calculating means.

* * * * *